(12) United States Patent  
Ryan et al.

(10) Patent No.: US 6,966,565 B1
(45) Date of Patent: Nov. 22, 2005

(54) SHOPPING CART HAVING SMALL ITEMS BAG

(75) Inventors: Mark T. Ryan, Haskell, OK (US); Charles A. Smith, Tahlequah, OK (US)

(73) Assignee: Unarco Industries, Inc., Wagoner, OK (US)

( * ) Notice: Subject to any disclaimer, the term of this patent is extended or adjusted under 35 U.S.C. 154(b) by 0 days.

(21) Appl. No.: 10/941,591

(22) Filed: Sep. 15, 2004

(51) Int. Cl.⁷ ................................. B60R 7/00
(52) U.S. Cl. ................................. 280/33.992
(58) Field of Search ...................... 280/33.992, 33.993, 280/47.35, 33.996, 33.991; 224/411

(56) References Cited

U.S. PATENT DOCUMENTS

| | | | | |
|---|---|---|---|---|
| 3,263,880 A | * | 8/1966 | Clement | 224/411 |
| 4,655,502 A | * | 4/1987 | Houllis | 297/229 |
| 4,666,207 A | * | 5/1987 | Quartano | 297/229 |
| 4,674,758 A | * | 6/1987 | Valley et al. | 280/33.993 |
| 4,805,937 A | * | 2/1989 | Boucher et al. | 280/33.992 |
| 4,871,100 A | * | 10/1989 | Posner | 224/411 |
| 5,542,687 A | * | 8/1996 | Harris | 280/33.993 |
| 5,678,888 A | * | 10/1997 | Sowell et al. | 297/256.17 |
| 6,003,894 A | * | 12/1999 | Maher | 280/639 |
| 6,237,998 B1 | * | 5/2001 | Aprile | 297/219.12 |
| 6,669,212 B2 | * | 12/2003 | Porter | 280/33.991 |
| 6,676,140 B1 | * | 1/2004 | Gondobintoro | 280/33.993 |
| 6,749,204 B2 | * | 6/2004 | Werner | 280/33.992 |

* cited by examiner

*Primary Examiner*—J. Allen Shriver
(74) *Attorney, Agent, or Firm*—Wood, Phillips, Katz, Clark & Mortimer

(57) ABSTRACT

In a shopping cart comprising a wheeled chassis, a handle structure mounted to the wheeled chassis, a basket supported by the wheeled chassis and mounted to the handle structure, and panels coactive with the handle structure and with one another and manipulatable so as to define a child seat, a flexible bag is mounted to the panels so as to be opened when the panels are manipulated to define the child seat and so as to be closed otherwise. The basket has multiple apertures, through which small items can drop. One of the panels has multiple apertures, through which small items can drop into the flexible bag when the flexible bag is opened. The flexible bag is made from a mesh, through which contents of the flexible bag are visible.

4 Claims, 3 Drawing Sheets

SHOPPING CART HAVING SMALL ITEMS BAG

TECHNICAL FIELD OF THE INVENTION

This invention pertains to a shopping cart of a type having a wheeled chassis, a handle structure mounted to the wheeled chassis, a basket supported by the wheeled chassis and mounted to the handle structure, and panels coactive with the handle structure and manipulatable to define a child seat.

BACKGROUND OF THE INVENTION

Commonly, in a shopping cart of the type noted above, whether the basket is made from welded wires or is molded from a polymeric material, the basket has a bottom wall having multiple apertures, through which small items can drop. It may be inconvenient, therefore, for a shopper seeking small items to use a shopping cart of the type noted above.

Although a shopping cart of the type noted above is not intended to provide a secure location for a purse or a wallet, it has been known for a shopper using a shopping cart of the type noted above to place a purse or a wallet in the basket or on the child seat, from either of which the purse or the wallet might be snatched by a passing thief, at a time when the shopper was distracted.

SUMMARY OF THE INVENTION

This invention improves a shopping cart comprising a wheeled chassis, a handle structure mounted to the wheeled chassis, and panels coactive with the handle structure and with one another and manipulatable so as to define a child seat, by providing the shopping cart with a flexible bag, which is mounted to the panels so as to be opened when the panels are manipulated to define the child seat and so as to be closed otherwise. Preferably, one of the panels has multiple apertures, through which small items can drop into the flexible bag when the flexible bag is opened.

On a preferred embodiment, wherein the handle structure includes two upright members extending generally uprightly from a rear portion of the wheeled chassis, wherein a basket is supported by the wheeled chassis and is mounted to the upright members so as to extend frontwardly from the upright members, wherein the basket has multiple apertures, through which small items can drop, wherein the panels are coactive with the upright members and with one another and are manipulatable between seat-operative positions, in which the panels define a child seat and one of the panels extends generally horizontally so as to be then adapted to support a child seated in the child seat, and seat-inoperative positions, in which the same one of the panels extends generally uprightly, the flexible bag, which has an upper mouth, is mounted to the panels so as to be opened at the upper mouth when the given one of the panels extends generally horizontally and so as to be closed at the upper mouth when the given one of the panels extends generally uprightly.

The flexible bag can hold small items, which can drop through multiple apertures, if present, in the bottom wall of the basket. If a purse or a wallet is placed in the flexible bag, rather than in the basket or on the child seat, it is harder for a passing thief to snatch the purse or the wallet. Preferably, the flexible bag is a mesh bag, through which contents of the flexible bag are visible.

BRIEF DESCRIPTION OF THE DRAWINGS

In FIG. 1, the upper mouth of the flexible bag is opened. Moreover, shopping cart elements not impacted by this invention are illustrated in broken lines.

DETAILED DESCRIPTION OF THE ILLUSTRATED EMBODIMENT

Figure 1:
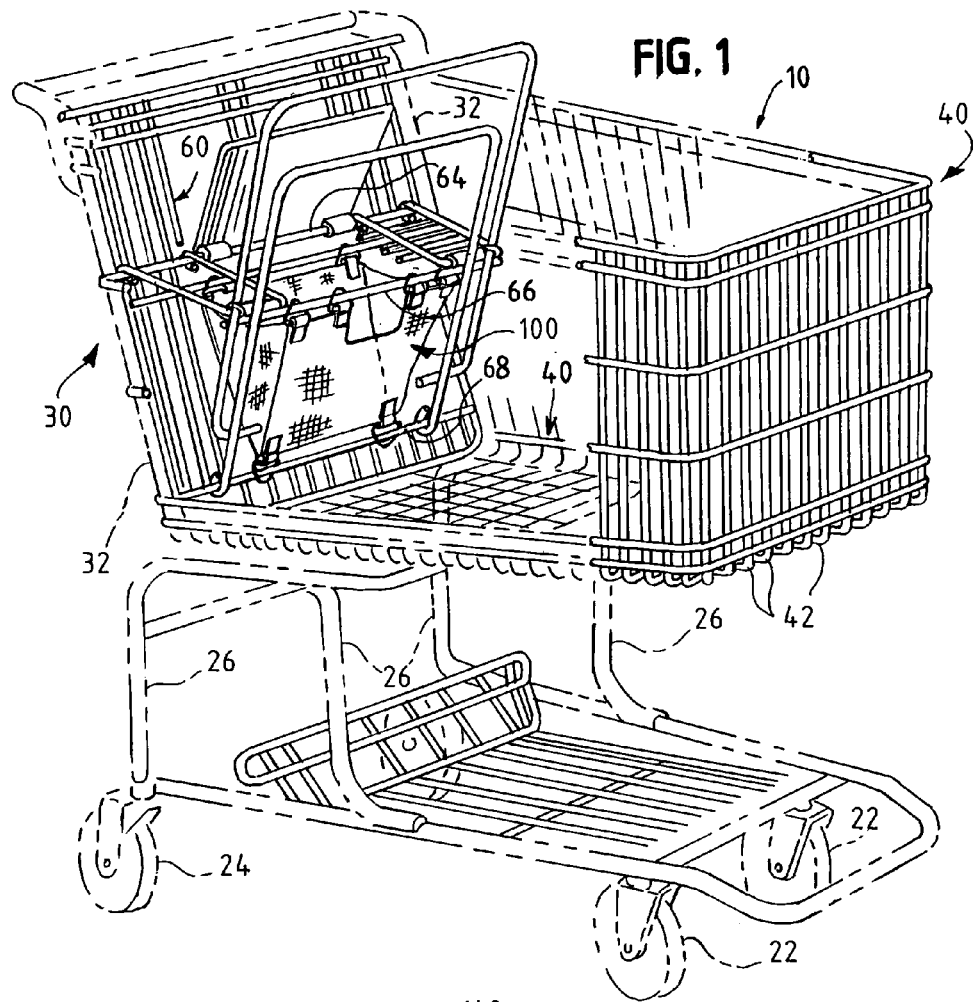
FIG. 1 is a perspective view of a shopping cart embodying this invention and comprising a wheeled chassis, a handle structure, a wire basket, panels manipulable to define a child seat, and, as provided by this invention, a flexible bag having an upper mouth.

As illustrated, a shopping cart 10 of the type noted above has a wheeled chassis 20, a handle structure 30 mounted to the wheeled chassis 20, a basket 40 supported by the wheeled chassis 20 and mounted to the handle structure 30, and panels described below, which are coactive with the handle structure 20 and with one another and which are manipulatable to define a child seat 50. As provided by this invention, the shopping cart 10 has a flexible bag 100, which is mounted to the panels so as to be opened when the panels are manipulated to define the child seat 50 and so as to be closed otherwise.

The wheeled chassis 20 has front casters 22, which are pivotable about vertical axes, and rear casters 24, which are not pivotable. The handle structure 30 comprises two upright members 32 extending uprightly from a rear portion of the wheeled chassis 20 and a generally horizontal handle 34 extending between the upper ends of the upright members 32. The basket 40 is supported by the wheeled chassis 20, via support braces 26, and is mounted to the upright members 32 so as to extend frontwardly from the upright members 32, over the wheeled chassis 20. Being made from welded wires, the basket 40 has a bottom wall 42 having multiple apertures 44, through which small items can drop.

The panels mentioned above comprise a rear gate 60, which is made from welded wires, which is mounted to the upright members 32 so as to be pivotable between a lowered position for usage of the shopping cart and a raised position for nesting of a similar cart into the shopping cart 10, and which has two leg openings 62 for the child seat 50. The panels mentioned above also comprise a seat base 70, which is made from welded wires, a seat back 80, which is made from welded wires, and a seat panel 90, which may be imperforate. Being made from welded wires, the seat base 70 has multiple apertures 72, through which small items can drop. The seat panel 90, which may be metal or plastic, is movable between a covering position wherein the seat panel 90 covers the seat base 70 but does not block the leg openings 62 and a blocking position wherein the seat panel does not cover the seat base 70 but blocks the leg openings 62.

The seat base 70 is mounted to the rear gate 60 so as to be pivotable, when the rear gate 70 is pivoted to the lowered position, between a usage position wherein the seat base 70 projects frontwardly from the rear gate 70, below the leg openings 62, and a storage position. The seat back 80 is mounted to the rear gate 60 so as to be pivotable conjointly with the seat base 70, when the rear gate 70 is pivoted to the lowered position, between a pivoted position corresponding to the usage position of the seat base 70 and a pivoted position corresponding to the storage position of the seat base 70. The seat panel 90 is mounted to the seat base 70 so as to be pivotable, when the rear gate 60 is pivoted to the lowered position, the seat base 70 is pivoted to its usage position, and the seat back 80 is pivoted to its pivoted position, between the covering position wherein the seat panel 90 projects frontwardly and covers the seat base 70 and the blocking position wherein the seat panel 90 rests against the rear gate 60 and blocks the leg openings 62.

The flexible bag 100 is made from a suitable mesh, such as a nylon mesh, through which contents of the flexible bag 100 are visible but which can hold small items, such as a shopper might place into the flexible bag 100. As illustrated, the flexible bag 100 has a rear panel 102, a front panel 104, and two lateral gussets 106. The panels 102, 104, meet at a lower fold 108 of the flexible bag 100. The panels 102, 104, and the gussets 106 define an upper mouth 110 of the flexible bag 100. The panel 104 has an upper recess 120, which communicates with the upper mouth 108, through which a shopper or someone else can place a purse, a wallet, or another item into the flexible bag 100, even if the upper mouth 110 is closed, and through which a shopper or someone else can remove such items from the flexible bag 100, whether the upper mouth 110 is opened or closed.

An upper edge 112 of the rear panel 102 is fastened to a horizontal wire 66 of the rear gate 60, via which wire 66 the seat base 70 is mounted pivotably to the rear gate 60. An upper edge 114 of the front panel 104 is fastened, on each side of the upper recess 120, to a horizontal wire 66 of the seat back 80. The lower fold 108 is fastened a horizontal wire 68 of the rear gate 60, which wire 68 is spaced downwardly from the horizontal wire 66 in the lowered position of the rear gate 60 and via which wire 68 the seat back 80 is mounted pivotably to the rear gate 60. The wires 64 extend generally vertically in the lowered position of the rear gate 60.

The flexible bag 100 is fastened, as and where described in the preceding paragraph, via wire hangers 130 passing around the wires 64, 66, 68, and through flexible loops 140, which are sewn to the flexible bag 100, and having their opposite ends 132 pressed together.

Figure 2:
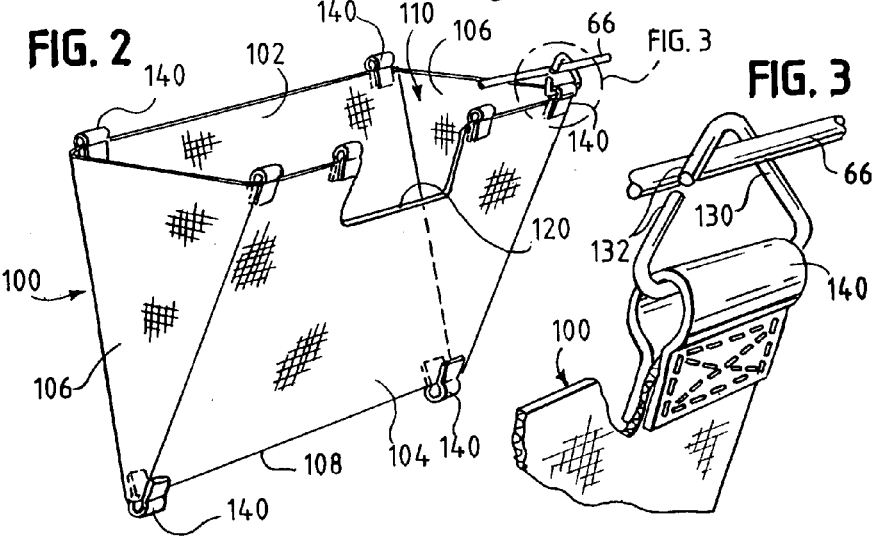
FIG. 2 is a perspective view of the flexible bag by itself, while opened at the upper mouth.
Figure 5:
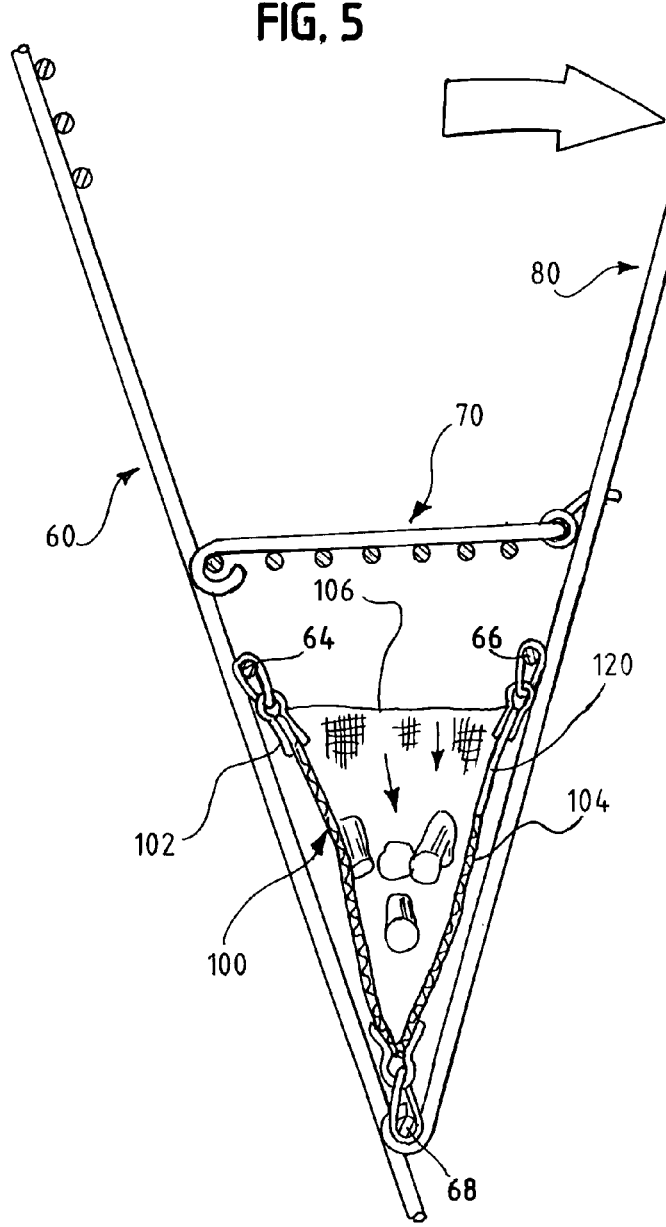
FIG. 5, on a larger scale, is a sectional view of the flexible bag and of those panels, as taken along line 5—5 in FIG. 4, in a direction indicated by arrows.

As illustrated in FIGS. 2 and 5, the flexible bag 100 is opened at its upper mouth 110 when the panels noted above are manipulated to seat-operative positions, which are those positions wherein the rear gate 60 is pivoted to the lowered position, wherein the seat base 70 is pivoted to the usage position, and wherein the seat back 80 is pivoted to the pivoted position corresponding to the usage position of the seat base 70, whereby the child seat 50 is defined. Thus, if the seat panel 90 is pivoted to the blocking position wherein the seat panel 90 does not cover the seat base 70, small items can be dropped through the apertures 72 of the seat base 70, through the upper mouth 110, into the flexible bag 100.

Figure 3:
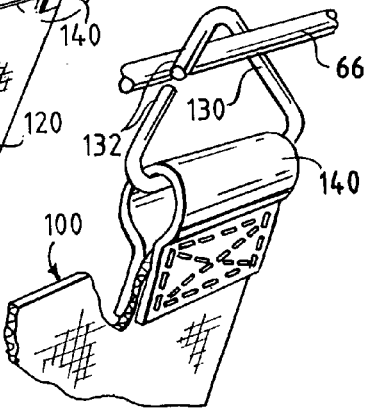
FIG. 3, on a larger scale, is a fragmentary detail taken in a region indicated in FIG. 2, illustrating a horizontal wire of the shopping, and exemplifying how the flexible bag is attached to the horizontal wire.
Figure 4:
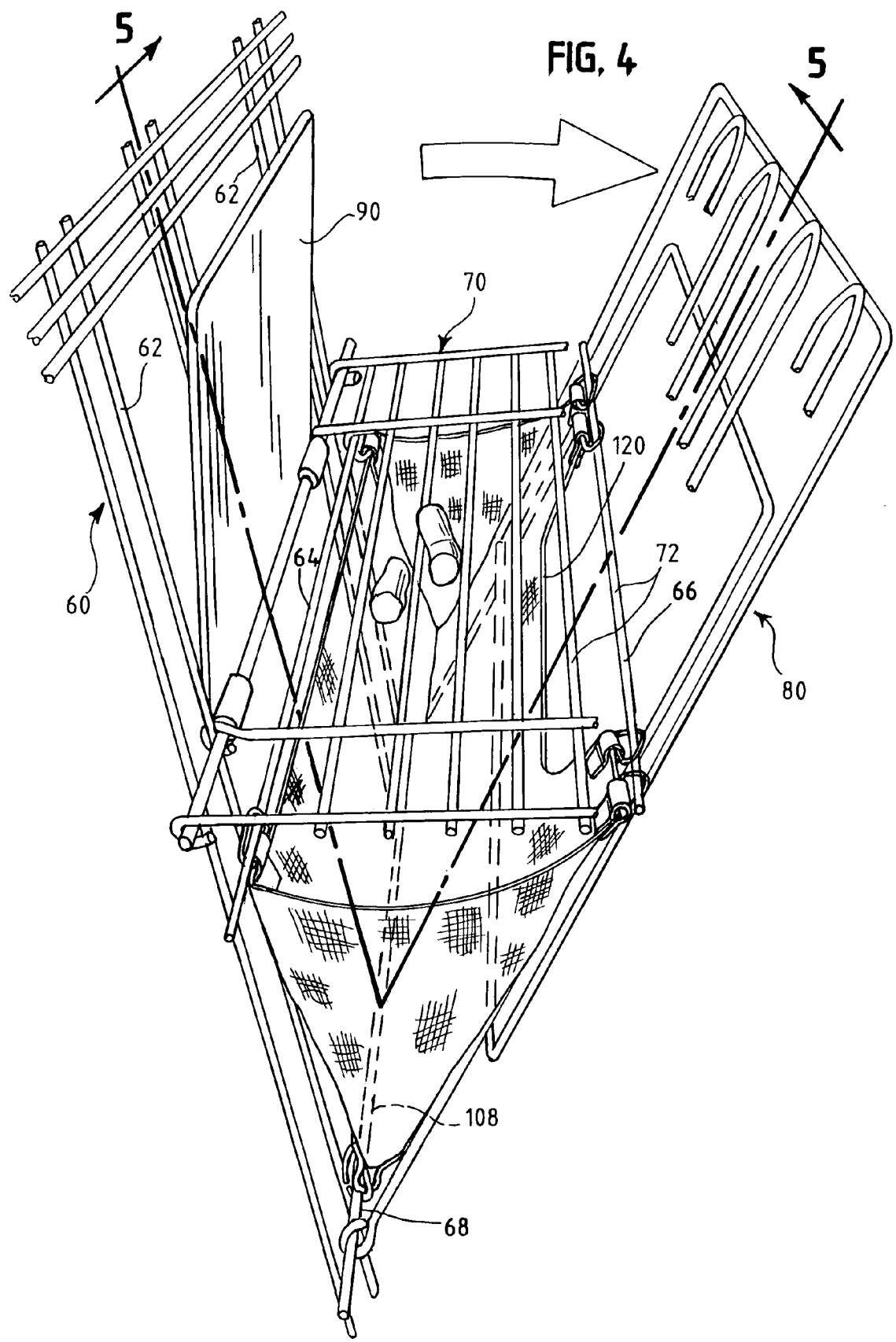
FIG. 4 is a perspective view of the flexible bag and of certain panels of the shopping cart, as viewed from a slightly different vantage, wherein the upper mouth of the flexible bag is closed.
Figure 6:
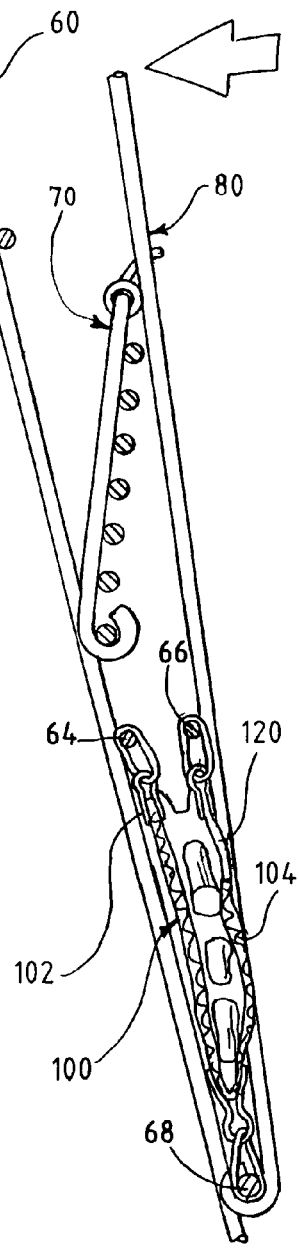
FIG. 6 is a sectional view, which is similar, except that the upper mouth of the flexible bag is closed.

As illustrated in FIGS. 3 and 6, the flexible bag 100 is closed at its upper mouth 110 when the panels noted above are manipulated to seat-inoperative positions, which are those positions wherein the seat base 70 is pivoted to the storage position and wherein the seat back 80 is pivoted to the pivoted position corresponding to the storage position of the seat base 70, whether the rear gate 60 is pivoted to the lowered position or to the raised position.

Conveniently and advantageously, the flexible bag 100 can hold small items, which could drop through the apertures 44 of the bottom wall 42 of the basket 40, or a larger item, such as a purse or a wallet.

What is claimed is:

1. A shopping cart comprising a wheeled chassis, a handle structure mounted to the wheeled chassis, panels coactive with the handle structure and with one another and manipulatable so as to define a child seat, and a flexible bag mounted to the panels so as to be opened when the panels are manipulated to define the child seat and so as to be closed otherwise, wherein one of the panels has multiple apertures, through which small items can drop into the flexible bag when the flexible bag is opened and wherein the flexible bag, when opened, is outside and below the child seat.

2. A shopping cart comprising a wheeled chassis, a handle structure mounted to the wheeled chassis, a basket supported by the wheeled chassis and mounted to the handle structure, the basket having a bottom wall having multiple apertures, through which small items can drop, panels coactive with the handle structure and with one another and manipulatable so as to define a child seat, and a flexible bag mounted to the panels so as to be opened when the panels are manipulated to define the child seat and so as to be closed otherwise, wherein one of the panels has multiple apertures, though which small items can drop into the flexible bag when the flexible bag is opened and wherein the flexible bag, when opened, is outside and below the child seat.

3. A shopping cart comprising a wheeled chassis, a handle structure mounted to the wheeled chassis and including two upright members extending generally uprightly from a rear portion of the wheeled chassis, a basket supported by the wheeled chassis and mounted to the upright members so as to extend frontwardly from the upright members, the basket having a bottom wall having multiple apertures, through which small items can drop, panels coactive with the upright members and with one another and manipulatable between seat-operative positions wherein the panels define a child seat, and wherein one of the panels extends generally horizontally so as to be then adapted to support a child seated in the child seat, and seat-inoperative positions, in which the same one of the panels extends generally uprightly, and a flexible bag having an upper mouth and being mounted to the panels so as to be opened at the upper mouth when the given one of the panels extends generally horizontally and so as to be closed at the upper mouth when the given one of the panels extends generally uprightly, wherein one of the panels has multiple apertures, through which small items can drop into the flexible bag when the flexible bag is opened and wherein the flexible bag, when opened, is outside and below the child seat.

4. The shopping cart of any preceding claim, wherein the flexible bag is a mesh bag, through which contents of the flexible bag are visible.

* * * * *